(12) United States Patent
Utsumi (10) Patent No.: US 8,515,033 B2
(45) Date of Patent: Aug. 20, 2013

(54) FACSIMILE COMMUNICATION APPARATUS, CONTROL METHOD THEREOF, AND PROGRAM

(75) Inventor: Yuichi Utsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 13/176,519

(22) Filed: Jul. 5, 2011

(65) Prior Publication Data

US 2012/0051528 A1 Mar. 1, 2012

(30) Foreign Application Priority Data

Aug. 24, 2010 (JP) ................................. 2010-187645

(51) Int. Cl.
*H04M 11/00* (2006.01)
(52) U.S. Cl.
USPC ............... 379/93.09; 379/100.05; 358/400
(58) Field of Classification Search
USPC ............... 379/93.09, 100.05, 100.09, 100.14; 358/400, 443
See application file for complete search history.

(56) References Cited

U.S. PATENT DOCUMENTS

| | | | | |
|---|---|---|---|---|
| 5,187,736 A | * | 2/1993 | Moriizumi | ............... 379/100.06 |
| 5,369,666 A | | 11/1994 | Folwell et al. | |
| 5,499,287 A | * | 3/1996 | Beck et al. | ..................... 379/442 |
| 5,825,505 A | * | 10/1998 | Toyoda et al. | ................ 358/400 |
| 6,008,909 A | | 12/1999 | Hui | |
| 6,259,589 B1 | | 7/2001 | Chao | |
| 7,092,499 B2 | * | 8/2006 | Saito et al. | ............... 379/100.16 |
| 2007/0286406 A1 | * | 12/2007 | Ishikawa | ................... 379/413.03 |
| 2010/0302123 A1 | * | 12/2010 | Knudsen et al. | .............. 343/861 |
| 2011/0019813 A1 | * | 1/2011 | Miura | ............................ 379/377 |

FOREIGN PATENT DOCUMENTS

| | | |
|---|---|---|
| JP | 03-235455 A | 10/1991 |
| JP | 6-098038 A | 4/1994 |
| JP | 9-247306 A | 9/1997 |
| WO | 01/69892 A2 | 9/2001 |

OTHER PUBLICATIONS

Extended European Search Report issued on Jul. 13, 2012, in counterpart application No. 11173021.4.

* cited by examiner

*Primary Examiner* — Creighton Smith
(74) *Attorney, Agent, or Firm* — Fitzpatrick, Cella, Harper & Scinto

(57) ABSTRACT

A facsimile communication apparatus for transmitting/receiving image data via a telephone public circuit network is provided. The apparatus includes: a detection unit configured to detect whether a call signal is being received from the telephone public circuit network; an acceptance unit configured to accept, when the detection unit detects that the call signal is being received, an instruction from a user to perform line capture for the call signal; and a control unit configured to control, when the acceptance unit accepts the instruction to perform line capture, the apparatus to perform line capture. When the acceptance unit accepts the instruction to perform line capture, the control unit controls the apparatus not to perform line capture during a call signal-on interval of the call signal.

6 Claims, 7 Drawing Sheets

FACSIMILE COMMUNICATION APPARATUS, CONTROL METHOD THEREOF, AND PROGRAM

BACKGROUND OF THE INVENTION

1. Field of the Invention

The present invention relates to a facsimile communication apparatus, a method for controlling a facsimile communication apparatus, and a program.

2. Description of the Related Art

To downsize a facsimile communication apparatus, a semiconductor data access arrangement (DAA) provided in an interface with a telephone public circuit network is used (see, for example, Japanese Patent Laid-Open No. 06-098038). The semiconductor DAA is generally less resistant to a high voltage or large current applied to lines during line capture (off-hook) as compared with a line interface (or NCU (Network Control Unit)) using a conventional line transformer and the like.

Some facsimile communication apparatuses have a manual reception mode (manual mode) in which the user responds to an incoming call from the telephone public circuit network by a manual operation. Upon reception of a call signal from the network, such a facsimile communication apparatus notifies the user of reception of the incoming call by generating an incoming call ringing tone or by ringing an external telephone connected to the facsimile communication apparatus by the call signal from the network. The user hears the incoming call ringing tone (ringing sound), presses a key of the facsimile communication apparatus to transit to an off-hook state, and then responds to the incoming call (see, for example, Japanese Patent Laid-Open No. 09-247306).

SUMMARY OF THE INVENTION

Even though a facsimile communication apparatus including a semiconductor DAA responds to a call signal from a telephone public circuit network to perform off-hook (perform line capture by closing a DC loop), detection of the DC loop in a switching equipment which is sending the call signal may be delayed, and the switching equipment may continuously send the call signal even after off-hook. If the switching equipment continuously sends the call signal even after it is off-hook, an electrical circuit of the semiconductor DAA may be damaged. Especially in a manual reception mode, since the user performs off-hook at an arbitrary timing, a high voltage (for example, an AC voltage of 65 V (rms) to 83 V (rms)) of the call signal may be applied to the semiconductor DAA which has closed the DC loop.

The present invention has been made in consideration of the above problem, and prevents damage due to an overcurrent passing through an internal circuit, which is caused by a call signal remaining after line capture, even when the user performs line capture at an arbitrary timing.

An first aspect of the present invention provides a facsimile communication apparatus for transmitting/receiving image data via a telephone public circuit network, comprising: a detection unit configured to detect whether a call signal is being received from the telephone public circuit network; an acceptance unit configured to accept, when the detection unit detects that the call signal is being received, an instruction from a user to perform line capture for the call signal; and a control unit configured to control, when the acceptance unit accepts the instruction to perform line capture, the apparatus to perform line capture, wherein when the acceptance unit accepts the instruction to perform line capture, the control unit controls the apparatus not to perform line capture during a call signal-on interval of the call signal.

A second aspect of the present invention provides a method for controlling a facsimile communication apparatus for transmitting/receiving image data via a telephone public circuit network, the method comprising: accepting, by an acceptance unit of the facsimile communication apparatus, when a detection unit detects that a call signal is being received, an instruction from a user to perform line capture for the call signal; and controlling, by a control unit of the facsimile communication apparatus, when the acceptance unit accepts the instruction to perform line capture, the apparatus to perform line capture, wherein when the acceptance unit accepts the instruction to perform line capture, the control unit controls the apparatus not to perform line capture during a call signal-on interval of the call signal.

Further features of the present invention will become apparent from the following description of exemplary embodiments (with reference to the attached drawings)

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Some embodiments of the present invention will be described in detail below with reference to the accompanying drawings. The following embodiments do not limit the scope of the appended claims. Furthermore, all combinations of features described in the embodiment are not necessarily essential for the present invention.

<Overall Configuration (FIG. 1)>

Figure 1:
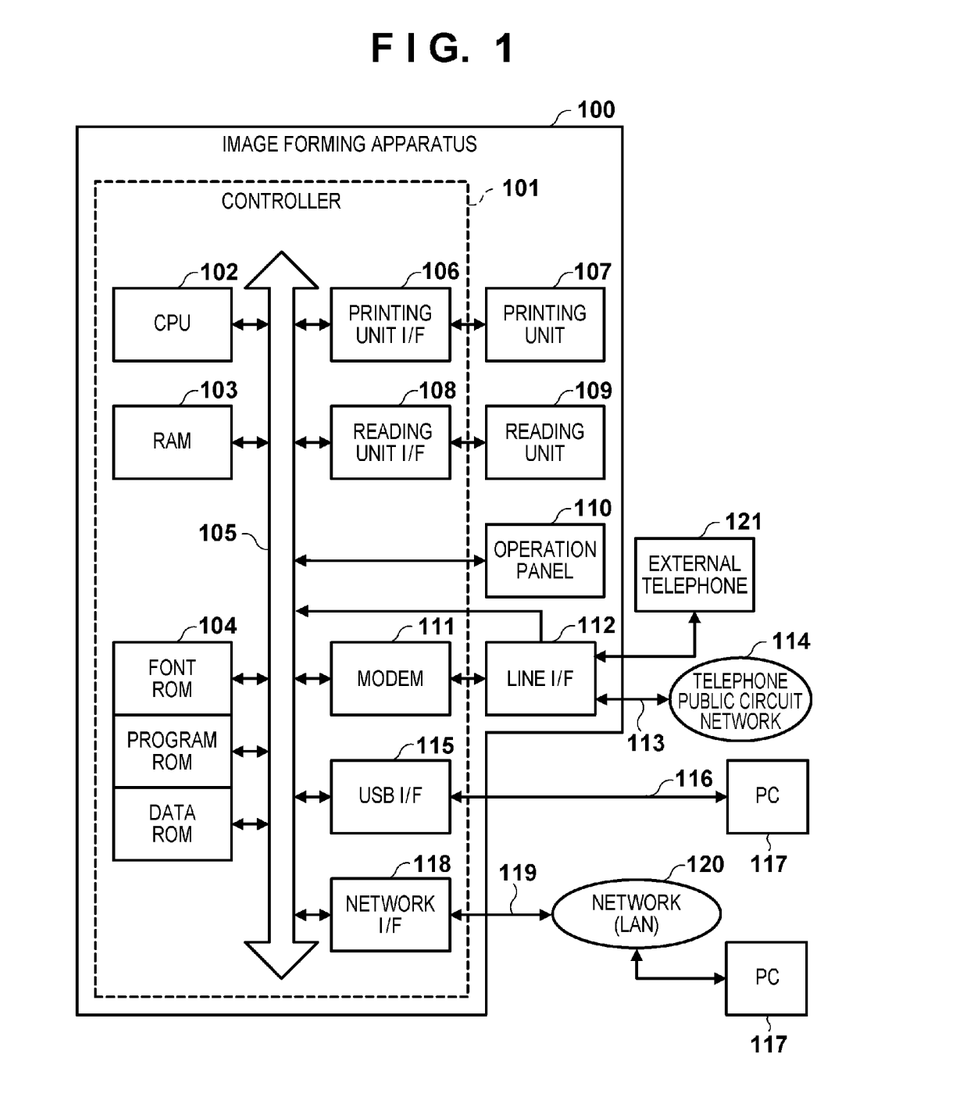
FIG. 1 is an exemplary block diagram showing the overall configuration of an image forming apparatus according to an embodiment of the present invention.

An image forming apparatus 100 functions as a facsimile communication apparatus for transmitting/receiving image data via a telephone public circuit network. The image forming apparatus 100 has a printing unit 107, a reading unit 109, an operation panel 110, a line I/F 112, and a controller 101 for controlling the above components.

The controller 101 includes a CPU 102, a RAM 103, a ROM 104, a printing unit I/F 106, a reading unit I/F 108, a modem 111, a USB I/F 115, and a network I/F 118. Each block is connected via a system bus 105. The CPU 102 comprehensively controls each block according to various control programs. Various control programs are stored in the program area of the ROM 104, and the CPU 102 reads out and executes a desired program. Alternatively, compressed data stored in the program area of the ROM 104 are decompressed and extracted on the RAM 103, and then executed. A hard disk drive (HDD) (not shown) may store the above various control programs in a compressed/uncompressed state.

The network I/F 118 makes communication with a host PC 117 (represented by a PC in FIG. 1, and to be referred to as a PC hereinafter) via a network (LAN) 120 connected using a LAN cable 119 or the like. The USB I/F 115 makes communication with the PC 117 via a USB cable 116 or the like. The network I/F 118 is connected to the network 120 by a communication cable such as the LAN cable 119.

The modem 111 is connected to a telephone public circuit network 114 (PSTN) via the line I/F 112, and makes communication with other image forming apparatuses and facsimiles (not shown) through the telephone public circuit network 114. The line I/F 112 is connected with the telephone public circuit network 114 by, for example, a telephone line 113. The line I/F 112 is used to connect an external telephone 121, and also switches between FAX communication and voice communication. The line I/F 112 may be configured as part of the controller 101.

The printing unit I/F 106 is an interface for outputting an image signal to the printing unit 107 (a printer engine). The reading unit I/F 108 is an interface for inputting a read image signal from the reading unit 109 (a scanner engine). The CPU 102 processes the image signal input from the reading unit 109, and then outputs it as a recording image signal to the printing unit I/F 106.

Using font information stored in the font area of the ROM 104, the CPU 102 displays texts and symbols on the display unit of the operation panel 110, and receives instruction information from the operation panel 110 which has received a user instruction.

The CPU 102 stores the apparatus information of the image forming apparatus 100, user telephone book information, department management information, and the like in the data area of the ROM 104, reads them out as needed, and updates them as needed.

<Detailed Configuration of Line I/F (FIG. 2)>

Figure 2:
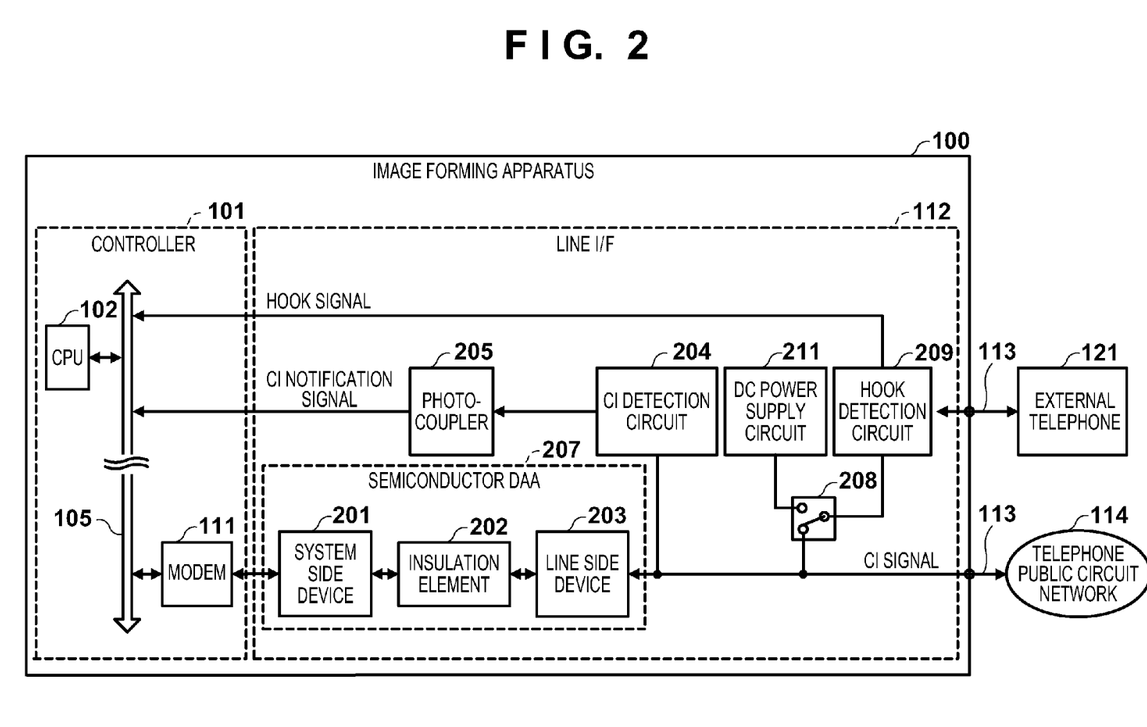
FIG. 2 is a block diagram showing the detailed configuration of an exemplary line I/F.

The line I/F 112 of the image forming apparatus 100 in the embodiments of the present invention will be explained in detail with reference to FIG. 2. The line I/F 112 includes a system side device 201, an insulation element 202, a line side device 203, a CI detection circuit 204, and a photo-coupler 205. The system side device 201, insulation element 202, and line side device 203 constitute a semiconductor DAA (Data Access Arrangement) (to also be referred to as a silicon DAA) 207. The insulation element 202 is provided to insulate (isolate) the system side (secondary side) of the semiconductor DAA 207 from the line side (telecommunication side). As the insulation element 202, for example, an isolation capacitor or transformer is used. The system side device 201 functions as an interface for exchanging data between the modem 111 and the line side device 203 via the insulation element 202. The line side device 203 serves as a semiconductor device having the function of a DAA (or NCU (Network Control Unit)).

The CI detection circuit 204 is provided between the telephone public circuit network 114 (PSTN) and the line side device 203, and detects a call signal (a CI (Call Indicator) signal or RI (Ring Indicator) signal) from the telephone public circuit network 114. In FIG. 2, the CI detection circuit 204 is separated from the semiconductor DAA 207 (more specifically, the line side device). If, however, the semiconductor DAA 207 has a CI detection function as in this embodiment, the CPU 102 may be notified using the function. The CPU 102 is notified, via the photo-coupler 205, of a signal (CI notification signal) for sending a CI generated in the CI detection circuit 204.

The external telephone 121 is connected to the line I/F 112 in parallel with the semiconductor DAA 207. A relay 208 (switching unit) enables to select a mode in which the external telephone 121 is directly connected to the telephone public circuit network 114 or a mode in which the external telephone 121 is physically separated from the telephone public circuit network 114. The CPU 102 instructs the relay 208 to switch the mode. In the mode in which the external telephone 121 is directly connected to the telephone public circuit network 114, a call signal is input from the telephone public circuit network 114 to the external telephone 121. Therefore, when there is an incoming call, the external telephone 121 rings. This mode will be referred to as a "ringing incoming call mode". When the relay 208 switches to the mode in which the external telephone 121 is separated from the telephone public circuit network 114, a call signal is not input from the telephone public circuit network 114 to the external telephone 121, and the CI detection circuit 204 of the line I/F 112 detects an incoming call. In this case, even if there is an incoming call, the external telephone does not ring (an incoming call ringing tone is disabled). Thus, this mode will be referred to as a "non-ringing incoming call mode".

If the user originates a call (makes a call) from the external telephone 121, the image forming apparatus 100 detects the off-hook of the external telephone 121, and executes necessary processing. Assume, for example, that the image forming apparatus 100 is in the non-ringing incoming call mode. In this case, when the user off-hooks the external telephone 121, the apparatus 100 detects it, and switches the relay 208 to the telephone public circuit network 114 side. Then, the apparatus detects the off-hook of the external telephone 121. In general, a hook detection circuit 209 detects off-hook based on a current flowing when the external telephone 121 is off-hooked, and transmits, to the CPU 102, a signal (hook signal) for notifying the CPU 102 of it. As described above, even in the non-ringing incoming call mode (even when the relay 208 separates the external telephone 121 from the telephone public circuit network 114), off-hook is detected based on a current. A DC power supply for generating a current is therefore used. In the non-ringing incoming call mode in which the external telephone 121 is separated from the telephone public circuit network 114, the relay 208 connects to a DC power supply to detect the off-hook of the external telephone 121. In this case, the relay 208 switches to connect with a DC power supply circuit 211.

<Detailed Configuration of Operation Panel (FIG. 3)>

Figure 3:
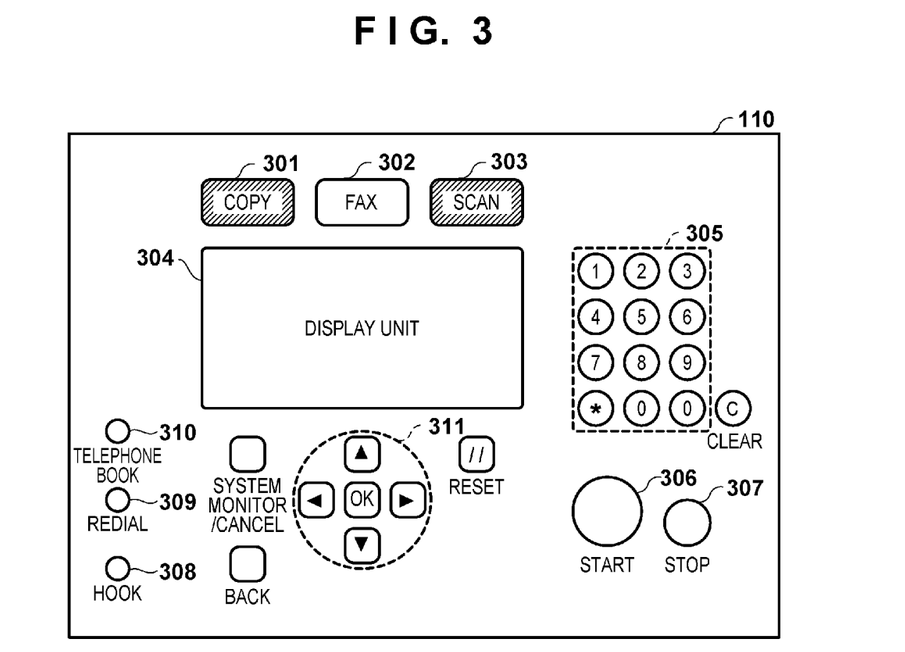
FIG. 3 is a view showing the detailed configuration of an exemplary operation panel.

The operation panel 110 serves as a UI for operating the image forming apparatus 100. The image forming apparatus 100 has a copy key 301, a FAX key 302, and a scan key 303 as buttons for switching functions. Upon pressing one of these keys, a screen for executing its function is displayed on a display unit 304. The display unit 304 is, for example, a liquid crystal display. Since the embodiments of the present invention are effective when using a FAX function, the operation panel 110 associated with the FAX function will be described here. A ten-key pad 305 is used to input a telephone number or the like. A start key 306 is pressed to execute FAX transmission, and a stop key 307 is pressed to stop the operation. A hook key 308 (acceptance unit) is used when the user manually responds to an incoming call, or manually performs FAX transmission. A redial key 309 is pressed to redial the last telephone number dialed. A telephone book key 310 is pressed to call up a telephone number registered in the image forming apparatus 100. Arrow/OK keys 311 are used to move a cursor displayed on the display unit 304 (the arrow keys), or confirm a selection (the OK key).

The image forming apparatus 100 has, as FAX reception modes, an automatic reception mode and a manual reception mode. In addition to these two modes, the image forming apparatus 100 may have a FAX/TEL automatic switching mode in which when the external telephone 121 is connected to the image forming apparatus 100, whether an incoming call is a phone call or fax call is automatically determined to switch the mode.

In the automatic reception mode, when an incoming call is received, the image forming apparatus 100 automatically responds (performs off-hook by the modem) to the incoming call after a predetermined number of ringing tones. On the contrary, in the manual reception mode, even when an incoming call is received, the image forming apparatus 100 does not automatically respond to the call but responds to the call according to a user operation. In the manual reception mode, the user can respond to the call by operating the external telephone 121 or the hook key 308 on the operation panel 110 of the image forming apparatus 100. When the user presses the hook key 308, the image forming apparatus 100 performs off-hook (line capture) for the telephone public circuit network 114 via the modem 111 and line I/F 112. More specifically, when the operation panel 110 notifies the CPU 102 of press of the hook key 308, the CPU 102 instructs the modem 111 to perform off-hook (line capture). The hook key 308 can also be used in a manual transmission mode.

<Call Signals (FIGS. 4 and 5)>

Figure 4:
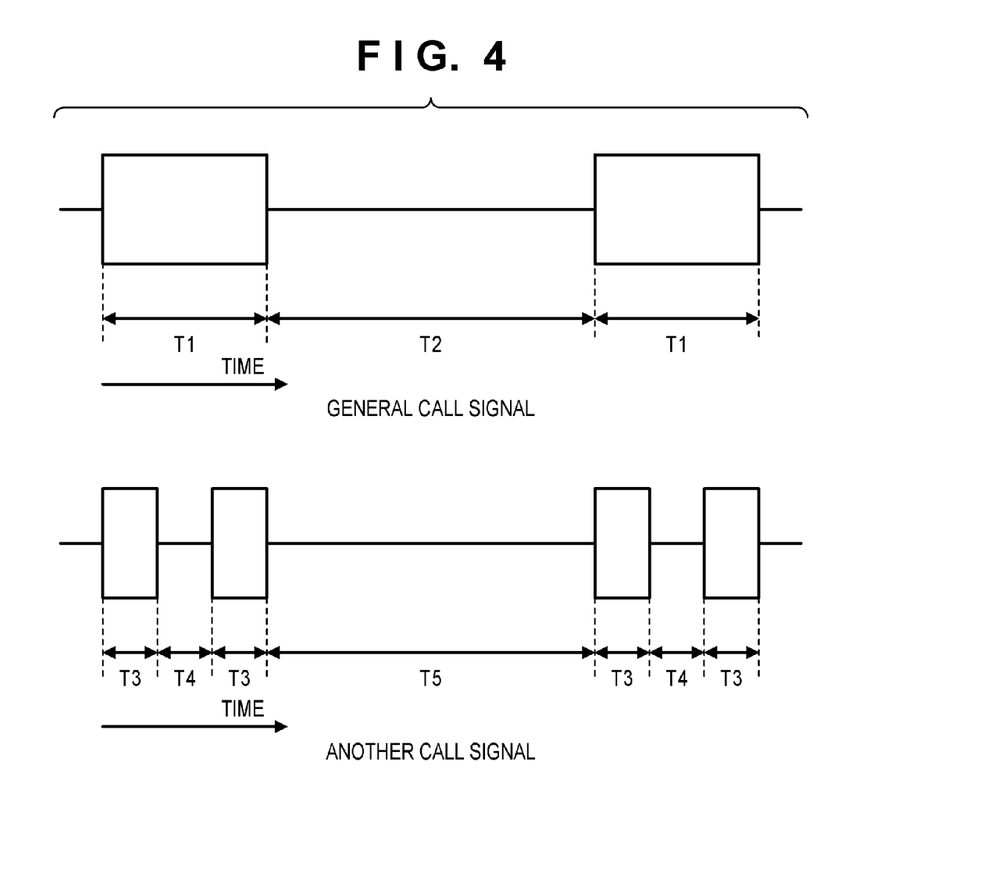
FIG. 4 is a view showing the pattern of a general call signal on the upper side, and the pattern of another call signal on the lower side.

FIG. 4 shows the patterns of call signals. The abscissa indicates time. FIG. 4 is based on technical reference materials about "Telephone Service Interface" of NTT East (Nippon Telegraph and Telephone East Corporation).

FIG. 4 shows, on its upper side, the pattern of a general call signal, which is a repetitive pattern of a call signal-on interval T1 and a call signal-off interval T2. According to the technical reference materials, the call signal-on interval T1 is about 1 sec, and the call signal-off interval T2 is about 2 sec.

FIG. 4 shows, on its lower side, the pattern of another call signal in which there is a short off interval T4 between call signal-on intervals T3, and there is a long off interval T5 after the intervals. As a call signal pattern used for an extension call, the call signal pattern shown on the lower side of FIG. 4 is used. In this case, T3 falls within the range from 0.25 to 0.3 sec, T4 falls within the range from 0.2 to 0.3 sec, and T5 is about 2 sec.

Figure 5:
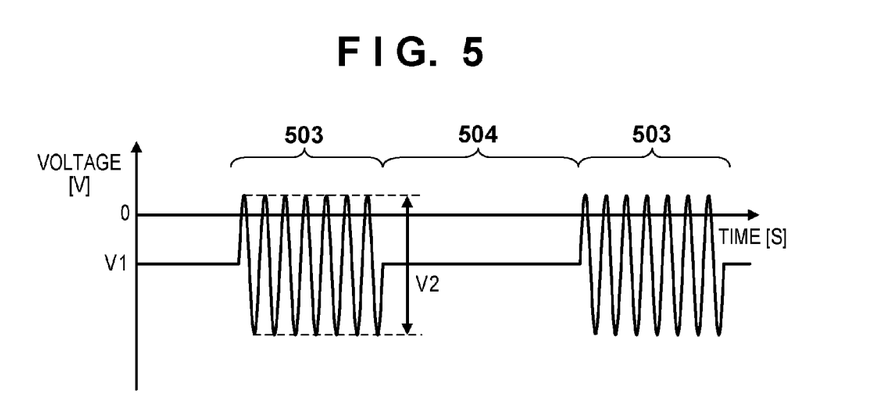
FIG. 5 is a timing chart showing the voltage waveform of an exemplary call signal.

FIG. 5 shows a voltage waveform during a call signal-on interval. The ordinate axis indicates a voltage and the abscissa axis indicates time. According to the above technical reference materials, during a call signal-on interval (an interval 503 in FIG. 5), a 15 to 20 Hz signal having an AC voltage of 65 V (rms) to 83 V (rms) is input from the telephone public circuit network 114. During a call signal-off interval (an interval 504 in FIG. 5), a DC voltage V1 ($\approx$−48V) at an electric potential of 0 V is applied to lines. An AC voltage V2 of a call signal falls within the range from 65 V (rms) to 83 V (rms).

The technical reference materials describe a technique in which when a reception side terminal performs off-hook in response to a call signal from the telephone public circuit network 114, the telephone public circuit network 114 detects it to stop sending the call signal. In some rare cases, however, assume that even though the reception side terminal has performed off-hook, the call signal may be continuously sent. In this case, an AC voltage of 65 V (rms) to 83 V (rms) (when the terminal is released) is applied to the semiconductor DAA 207 which has closed the DC loop (loop close). The semiconductor DAA 207 is generally less resistant to a high voltage or large current when the DC loop is closed as compared with an NCU constituted by discrete components. After the DC loop is closed (off-hook), therefore, if the call signal remains, the semiconductor DAA 207 may be damaged.

Especially in the manual reception mode in which the user performs off-hook at an arbitrary timing, the user may perform off-hook while the above call signal is received, thereby potentially damaging the semiconductor DAA 207. In the embodiments, the image forming apparatus 100 serving as a facsimile communication apparatus is controlled, as will be described below.

<Manual Reception Mode Control Sequence (FIG. 6)>

Figure 6:
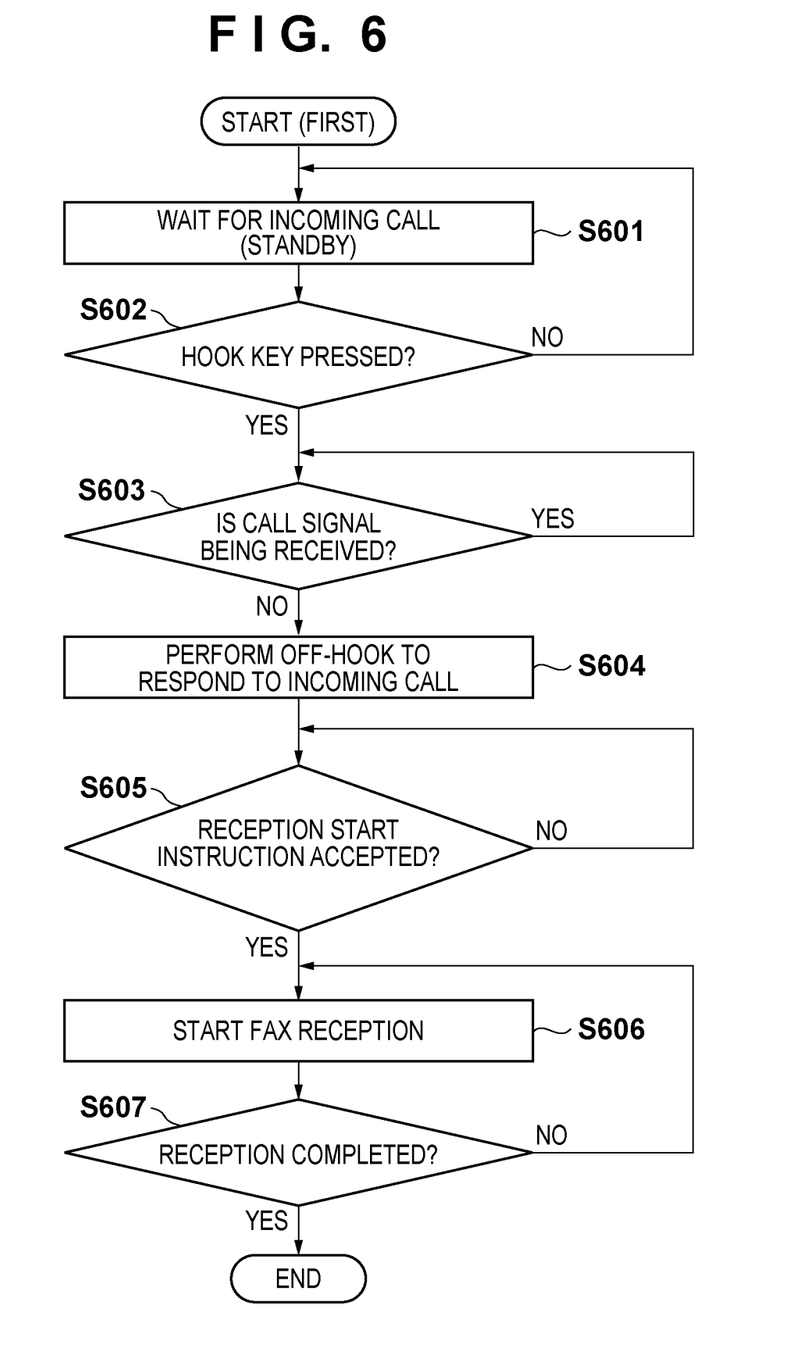
FIG. 6 is a flowchart showing an operation example in manually receiving an incoming call.

In the manual reception mode, the controller 101 waits for the user to press the hook key 308 to respond to an incoming call (S601 and S602). If the user presses the hook key 308 (YES in step S602), the controller 101 monitors a call signal using the CI detection circuit 204 or line side device 203 described with reference to FIG. 2, and determines whether the call signal is being received at this time (S603). If the call signal is being received at this time (YES in step S603), the controller 101 repeatedly detects the state of the call signal until the call signal is not received; otherwise (NO in step S603), the controller 101 immediately performs off-hook (line capture) to respond to the incoming call (S604). After off-hook, when the controller 101 accepts a FAX reception start instruction from the user (YES in step S605), it starts a FAX reception operation (S606). Then, once the FAX reception operation is completed, the controller 101 terminates the manual reception mode control sequence (S607).

As described above, in this example, even if the controller 101 receives an off-hook instruction from the user at an arbitrary timing (S602), when it is detected that the call signal is being received (S603), the controller 101 does not transit to an off-hook state (S604). This makes it possible to avoid performing off-hook such that an AC voltage is applied while the calling signal is received, thereby preventing the semiconductor DAA 207 from being damaged due to the residual signal of the call signal.

Another example will be explained below in which part of the control sequence shown in FIG. 6 is changed to improve the usability. The hardware configuration of the image forming apparatus 100 is as shown in FIGS. 1 and 2.

<Manual Reception Mode Control Sequence (FIG. 7)>

Figure 7:
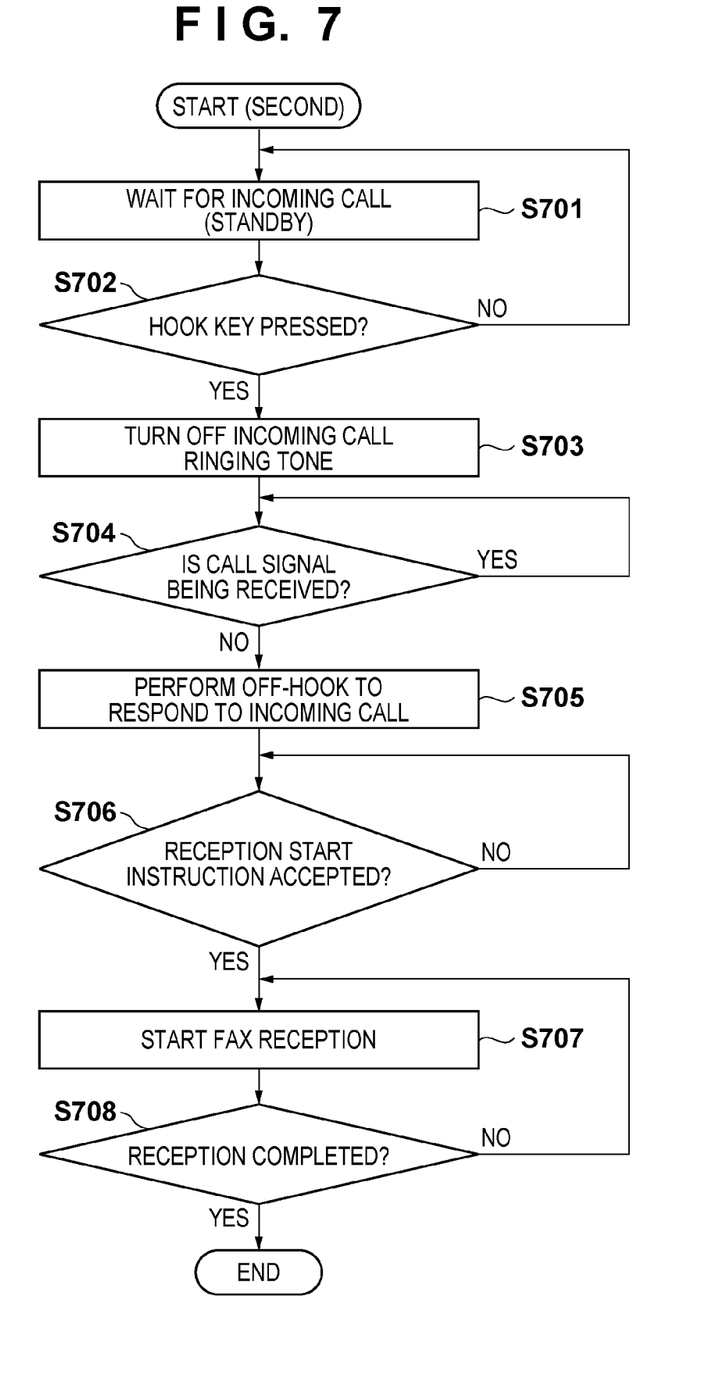
FIG. 7 is a flowchart showing another operation example in manually receiving an incoming call.

In the example described using FIG. 6, even if the user presses the hook key 308, there is no response until the call signal is disabled. The user, therefore, may misunderstand that the processing does not progress normally. To solve this problem, by adding a process in step S703 to stop outputting an incoming call ringing tone immediately after pressing the hook key 308, it is possible to indicate to the user that the processing progresses at this time, thereby avoiding user misunderstanding.

To prevent the semiconductor DAA 207 from being damaged, even when the user presses the hook key 308, the controller 101 does not immediately transit to an off-hook state if the call signal is being received at this time (S701 and S702). If press of the hook key 308 is detected in step S702, the controller 101 (an output control unit) turns off the incoming call ringing tone (S703). After that, if the call signal is not being received (S704), the controller 101 performs off-hook to respond to an incoming call (S705). Subsequent processing is the same as in FIG. 6, and a description thereof will be omitted.

Processing for turning off the incoming call ringing tone in step S703 will be explained in detail next. The incoming call ringing tone is a sound for notifying the user that a call signal is received from the telephone public circuit network 114 and the external telephone 121 is receiving an incoming call. In this example, assume that the controller 101 stands by in the manual reception mode. When, therefore, the external telephone 121 receives a call signal and generates an incoming call ringing tone (rings), the user recognizes that there is an incoming call. After that, when the user presses the hook key 308 of the operation panel 110, in this example, the relay 208 switches to the DC power supply circuit 211 side. With this operation, the external telephone 121 is separated from the telephone public circuit network 114, and it is possible to stop outputting the incoming call ringing tone of the external telephone 121.

As described above, while avoiding the semiconductor DAA 207 from being damaged as in the example explained using FIG. 6, it is possible to indicate to the user who has pressed the hook key that the processing progresses normally.

With reference to FIG. 7, the processing of the relay 208 for switching the connection destination of the external telephone 121 from the semiconductor DAA 207 to the DC power supply circuit 211 in the process (S703) for turning off the incoming call ringing tone has been explained. The present invention is also applicable to a configuration in which the external telephone 121 is not connected to the image forming apparatus 100.

If a loudspeaker (notification unit) (not shown) included in the image forming apparatus 100 outputs an incoming call ringing tone for notifying the user of an incoming call, a process for stopping output from the loudspeaker replaces the process (S703) for turning off the incoming call ringing tone. This can solve the problem of the present invention by executing the processing represented by the flowchart of FIG. 7, even if manual reception is performed when the external telephone 121 is not connected to the image forming apparatus 100.

As described above using the embodiments, applying the present invention enables to avoid the semiconductor DAA from being damaged due to a call signal even in the manual reception mode in which the user responds to an incoming call at an arbitrary timing.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187645, filed Aug. 24, 2010, which is hereby incorporated by reference herein in its entirety.

What is claimed is:

1. A facsimile communication apparatus for transmitting/receiving image data via a telephone public circuit network, comprising:

a detection unit configured to detect whether a call signal is being received from the telephone public circuit network;

an acceptance unit configured to accept, when the detection unit detects that the call signal is being received, an instruction from a user to perform line capture for the call signal; and a control unit configured to control, when the acceptance unit accepts the instruction to perform line capture, the apparatus to perform line capture, wherein when the acceptance unit accepts the instruction to perform line capture, the control unit controls the apparatus not to perform line capture during a call signal-on interval of the call signal.

2. The apparatus according to claim 1, further comprising:

an output control unit configured to output a sound for notifying the user that the call signal is being receiving from the telephone public circuit network while receiving the call signal, wherein when the acceptance unit accepts the instruction from the user to perform line capture, the output control unit stops output of the sound before the detection unit detects that the call signal is not being received.

3. The apparatus according to claim 2, further comprising:

an external telephone; and a switching unit configured to switch between a state in which the external telephone is connected to the telephone public circuit network and a state in which the external telephone is connected to a DC power supply physically separated from the telephone public circuit network, wherein the output control unit controls the apparatus not to output the notification sound from the external telephone by causing the switching unit to switch from the state in which the external telephone is connected to the telephone public circuit network to the state in which the external telephone is connected to the DC power supply.

4. A method for controlling a facsimile communication apparatus for transmitting/receiving image data via a telephone public circuit network, the method comprising:

accepting, by an acceptance unit of the facsimile communication apparatus, when a detection unit detects that a call signal is being received, an instruction from a user to perform line capture for the call signal; and controlling, by a control unit of the facsimile communication apparatus, when the acceptance unit accepts the instruction to perform line capture, the apparatus to perform line capture, wherein when the acceptance unit accepts the instruction to perform line capture, the control unit controls the apparatus not to perform line capture during a call signal-on interval of the call signal.

5. A computer program stored in a computer-readable storage medium, the program causing a computer to, in a facsimile communication apparatus for transmitting/receiving image data via a telephone public circuit network, function as a detection unit configured to detect whether a call signal is being received from the telephone public circuit network, an acceptance unit configured to accept, when the detection unit detects that the call signal is being received, an instruction from a user to perform line capture for the call signal, and a control unit configured to control, when the acceptance unit accepts the instruction to perform line capture, the apparatus to perform line capture, wherein when the acceptance unit accepts the instruction to perform line capture, the control unit controls the apparatus not to perform line capture during a call signal-on interval of the call signal.

6. The apparatus according to claim 1, wherein when the acceptance unit accepts the instruction to perform line capture, the control unit controls the apparatus to perform line capture during a call signal-off interval of the call signal.

* * * * *